US010687685B2

(12) United States Patent
Son et al.

(10) Patent No.: US 10,687,685 B2
(45) Date of Patent: Jun. 23, 2020

(54) DISHWASHER

(71) Applicant: LG Electronics Inc., Seoul (KR)

(72) Inventors: Bongsoo Son, Seoul (KR); Donghwi Park, Seoul (KR); Hyoseong Gwag, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 552 days.

(21) Appl. No.: 15/303,702

(22) PCT Filed: Jun. 27, 2016

(86) PCT No.: PCT/KR2016/006843
§ 371 (c)(1),
(2) Date: Oct. 12, 2016

(87) PCT Pub. No.: WO2017/010699
PCT Pub. Date: Jan. 19, 2017

(65) Prior Publication Data
US 2017/0172376 A1 Jun. 22, 2017

(30) Foreign Application Priority Data

Jul. 14, 2015 (KR) .................. 10-2015-0099660

(51) Int. Cl.
A47L 15/42 (2006.01)
F16B 39/30 (2006.01)
(Continued)

(52) U.S. Cl.
CPC ........ *A47L 15/4253* (2013.01); *A47B 91/024* (2013.01); *A47L 15/4219* (2013.01);
(Continued)

(58) Field of Classification Search
CPC ... A47B 91/024; A47B 91/022; A47B 91/028; A47B 2095/004; A47B 2220/003;
(Continued)

(56) References Cited

U.S. PATENT DOCUMENTS 3,565,377 A * 2/1971 Schreyer ............ A47B 17/003
248/188.4
3,575,288 A * 4/1971 Brucken ............ A47B 91/024
206/320
(Continued)

FOREIGN PATENT DOCUMENTS

CN 101686790 A 3/2010
CN 201502608 U 6/2010
(Continued)

OTHER PUBLICATIONS

Kawase et al., "Adjustable Leg for Machine", Aug. 2014, WO-2014122886—Machine Translation (Year: 2014).*

*Primary Examiner* — David G Cormier
*Assistant Examiner* — Thomas Bucci
(74) *Attorney, Agent, or Firm* — Dentons US LLP

(57) ABSTRACT

A dishwasher is disclosed, which comprises a cabinet; a base forming a lower portion of the cabinet; and a support coupled to a coupling portion provided in the base, supporting the cabinet, wherein the coupling portion includes a hollow shaped coupling hole; and a plurality of first threads formed in the coupling hole, and the support includes a plurality of second threads engaged with the first threads; and a stopper formed to be protruded at a groove of the second thread.

14 Claims, 4 Drawing Sheets

(51) Int. Cl.
*A47B 91/02* (2006.01)
*A47L 15/50* (2006.01)

(52) U.S. Cl.
CPC ............ *A47L 15/507* (2013.01); *F16B 39/30* (2013.01); *A47L 15/4225* (2013.01)

(58) Field of Classification Search
CPC ......... A47B 91/00; A47B 91/02; F16B 39/30; F16B 33/02; F16B 25/0052; F16B 25/0047; A47L 15/4253; A47L 15/427; A47L 15/4246
USPC .......... 134/186, 198, 115 R, 201; 248/188.4, 248/188.2, 188.8, 677, 678, 650, 157; 312/228, 351.1, 351.3; 411/938, 310, 411/311, 411, 437, 277, 929, 307
See application file for complete search history.

(56) References Cited

U.S. PATENT DOCUMENTS

| | | | | |
|---|---|---|---|---|
| 3,641,620 A * | 2/1972 | Hage | ............... | A47B 91/024 16/19 |
| 3,664,400 A * | 5/1972 | Moore | ............... | F16B 39/30 411/308 |
| 3,683,989 A * | 8/1972 | Follstaedt | ............... | F16B 39/284 411/277 |
| 3,731,725 A * | 5/1973 | Brophy | ............... | F16B 39/30 411/310 |
| 3,750,989 A * | 8/1973 | Bergeson | ............... | A47L 15/4253 248/650 |
| 3,814,363 A * | 6/1974 | Brelosky | ............... | A47B 91/028 248/188.4 |
| 3,844,518 A * | 10/1974 | Long | ............... | A47B 91/024 248/188.4 |
| 3,850,215 A * | 11/1974 | Orlomoski | ............... | B21H 3/025 411/311 |
| 3,868,079 A * | 2/1975 | Johnson | ............... | A47B 91/024 248/188.4 |
| 3,905,663 A * | 9/1975 | Bergeson | ............... | A47L 15/4225 312/351.11 |
| 4,202,083 A * | 5/1980 | Gutner | ............... | A47B 91/024 248/300 |
| 4,313,586 A * | 2/1982 | Grzesnikowski | .... | A47B 91/024 248/188.4 |
| 4,368,869 A * | 1/1983 | Gelvezon | ............... | F16M 7/00 248/188.2 |
| 4,674,931 A * | 6/1987 | Schwind | ............... | F16B 37/041 411/175 |
| 4,693,526 A * | 9/1987 | Spiegel | ............... | A47L 15/4253 312/228 |
| 4,915,334 A * | 4/1990 | White | ............... | A47B 91/024 248/188.4 |
| 5,141,190 A * | 8/1992 | Wu | ............... | A47B 91/024 248/188.4 |
| 5,169,259 A * | 12/1992 | Cornell, Jr. | ............... | A47B 91/024 403/309 |
| 5,881,979 A * | 3/1999 | Rozier, Jr. | ............... | A47B 91/024 248/188.4 |
| 5,967,472 A * | 10/1999 | Wilhelmstatter | .... | A47B 91/028 248/188.2 |
| 6,142,431 A * | 11/2000 | Herzog | ............... | A47B 91/024 248/188.4 |
| 6,186,453 B1 * | 2/2001 | Redbone | ............... | A47B 91/024 16/42 R |
| 6,520,461 B1 * | 2/2003 | Graham | ............... | A47B 91/024 248/157 |
| 6,572,315 B1 * | 6/2003 | Reed | ............... | F16B 39/30 411/307 |
| 7,780,128 B2 * | 8/2010 | Walsberg | ............... | A47B 91/024 248/188.2 |
| 9,074,809 B2 * | 7/2015 | Lee | ............... | F25D 23/028 |
| 2002/0084390 A1 * | 7/2002 | Parisi | ............... | A47B 91/024 248/188.8 |
| 2003/0136887 A1 * | 7/2003 | Gabriel | ............... | A47L 15/4253 248/188.2 |
| 2005/0103966 A1 * | 5/2005 | Kim | ............... | A47B 91/024 248/346.05 |
| 2005/0218276 A1 * | 10/2005 | Inoue | ............... | A47B 91/024 248/188.8 |
| 2005/0247834 A1 * | 11/2005 | Thuelig | ............... | F16M 7/00 248/188.4 |
| 2006/0043251 A1 * | 3/2006 | Inoue | ............... | A47B 91/022 248/346.11 |
| 2006/0091269 A1 * | 5/2006 | Hanson | ............... | A47B 91/024 248/188.4 |
| 2006/0102815 A1 * | 5/2006 | Erdmann | ............... | A47L 15/4253 248/188.2 |
| 2006/0131466 A1 * | 6/2006 | Cha | ............... | A47B 91/024 248/188.8 |
| 2006/0266896 A1 * | 11/2006 | Balistreri | ............... | A47B 91/024 248/188.4 |
| 2007/0240744 A1 * | 10/2007 | Schlief | ............... | A47L 15/4261 134/104.4 |
| 2007/0262213 A1 * | 11/2007 | de Toledo | ............... | A47L 15/4253 248/188.8 |
| 2007/0267561 A1 * | 11/2007 | Dam | ............... | A47B 91/024 248/615 |
| 2007/0280803 A1 * | 12/2007 | Pritchard | ............... | F16B 33/02 411/411 |
| 2008/0116330 A1 * | 5/2008 | Cotto | ............... | A47B 91/024 248/188.4 |
| 2008/0168855 A1 * | 7/2008 | Giefer | ............... | A47L 15/4253 74/412 R |
| 2008/0191111 A1 * | 8/2008 | Selle | ............... | A47B 91/024 248/302 |
| 2008/0251685 A1 * | 10/2008 | Tschinkel | ............... | A47B 91/00 248/677 |
| 2009/0001246 A1 * | 1/2009 | Phillips | ............... | A47L 15/4253 248/680 |
| 2009/0169330 A1 * | 7/2009 | Moore | ............... | F16B 35/041 411/306 |
| 2009/0274535 A1 * | 11/2009 | Mair | ............... | F16B 39/30 411/305 |
| 2010/0243847 A1 * | 9/2010 | Kucuk | ............... | A47L 15/427 248/346.03 |
| 2011/0148259 A1 * | 6/2011 | Justis | ............... | A47B 49/024 312/228 |
| 2011/0198458 A1 * | 8/2011 | Karl | ............... | A47B 91/024 248/188.4 |
| 2011/0297802 A1 * | 12/2011 | Gennaretti | ............ | D06F 39/125 248/188.4 |
| 2013/0180556 A1 * | 7/2013 | Boyer | ............... | A47L 15/4253 134/198 |
| 2014/0312757 A1 * | 10/2014 | Bridges | ............... | A47B 91/024 312/351.3 |
| 2016/0081474 A1 * | 3/2016 | Basesme | ............... | A47B 91/02 248/188.4 |
| 2017/0224112 A1 * | 8/2017 | Devereux | ............... | F16M 7/00 |
| 2017/0290426 A1 * | 10/2017 | Hovenden | ............ | A47B 91/024 |
| 2018/0125324 A1 * | 5/2018 | Kangas | ............... | A47L 15/4253 |

FOREIGN PATENT DOCUMENTS

| | | |
|---|---|---|
| CN | 101868165 A | 10/2010 |
| CN | 101878336 A | 11/2010 |
| CN | 102481083 A | 5/2012 |
| CN | 102741570 A | 10/2012 |
| JP | 50-106552 U | 2/1974 |
| JP | 08-170626 A | 7/1996 |
| WO | 2009056449 A1 | 5/2009 |
| WO | 2012-044259 A1 | 4/2012 |
| WO | 2014-122886 A1 | 8/2014 |
| WO | WO-2014122886 A1 * | 8/2014 ........... F16M 11/046 |

* cited by examiner

[Fig. 2]

[Fig. 3]
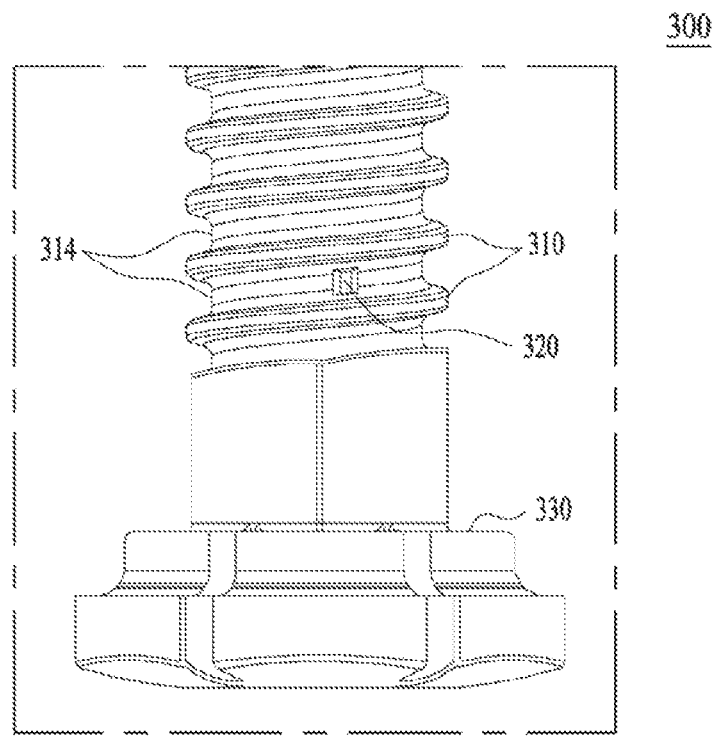
[Fig. 4a]
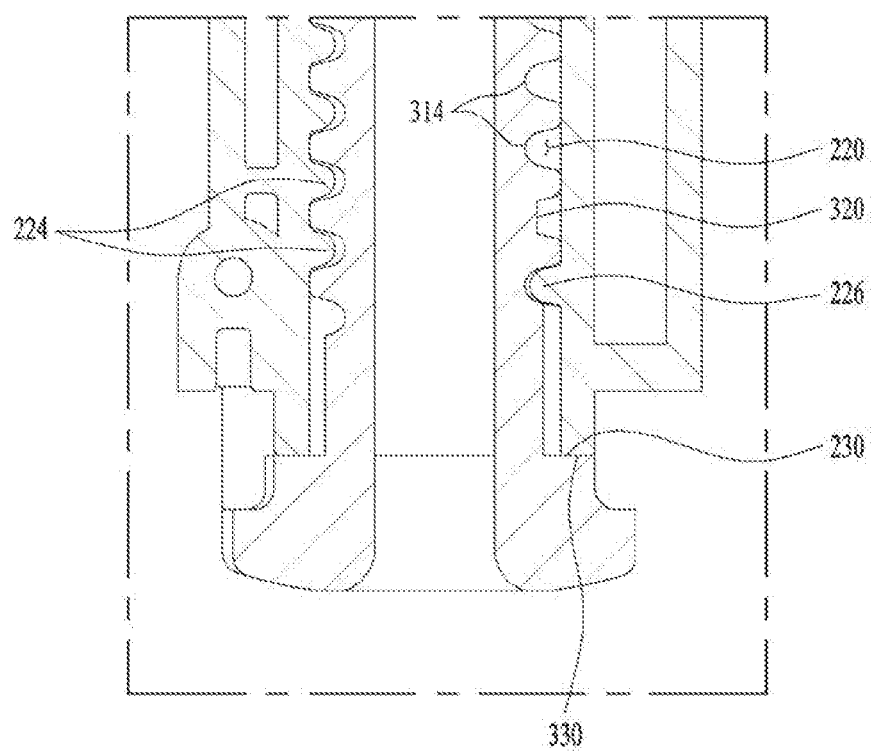

[Fig. 4b]
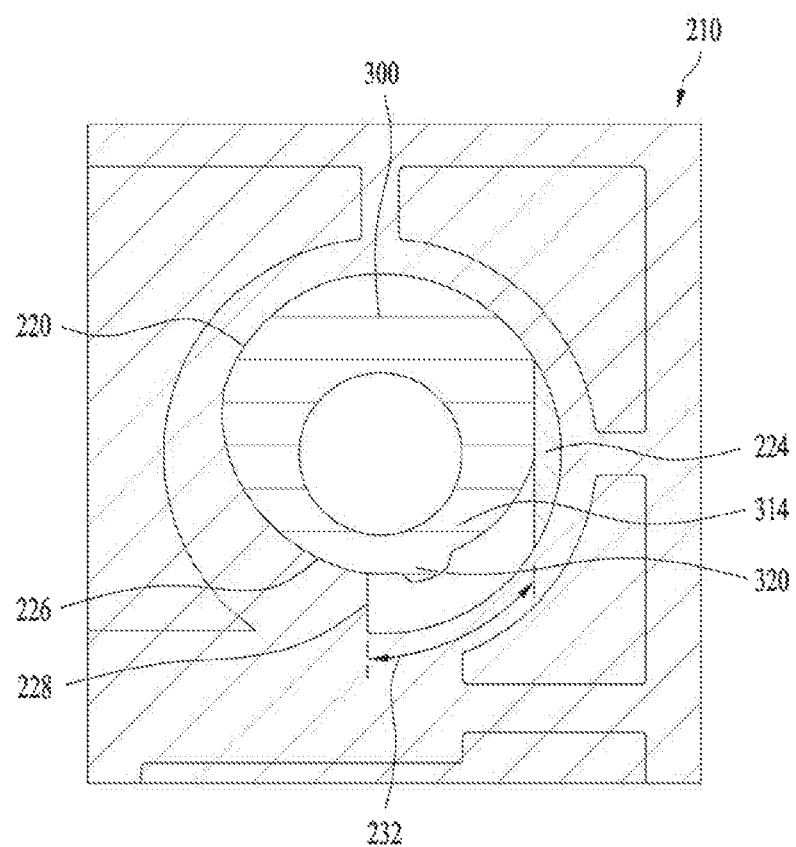

[Fig. 5]
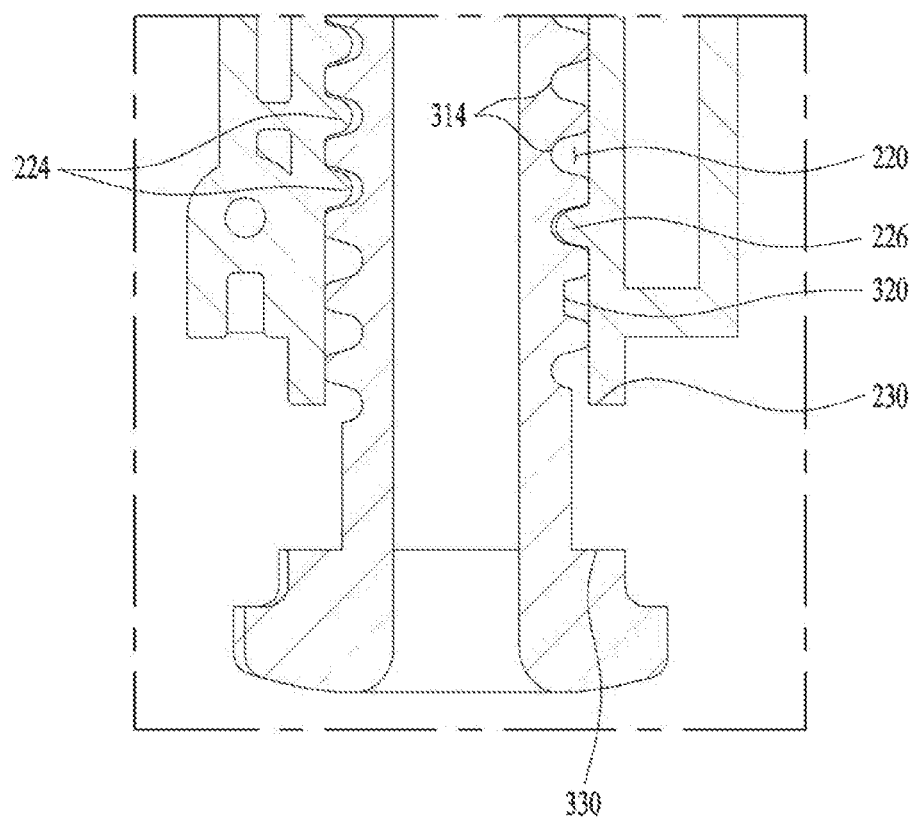

US 10,687,685 B2

DISHWASHER

This application is a National Stage Entry of International Application No. PCT/KR2016/006843, filed Jun. 27, 2016, which claims the benefit of Korean International Application No. 10-2015-0099660, filed Jul. 14, 2015, both of which are hereby incorporated by reference in their entirety for all purposes as if fully set forth herein.

TECHNICAL FIELD

The present invention relates to a dishwasher, and more particularly, to a dishwasher that may prevent a support, which supports the dishwasher, from being loosed within a certain range.

BACKGROUND ART

A dishwasher is an appliance that washes food leftovers remaining on the dishes or cooking utensils (hereinafter, referred to as 'washing target') by using a detergent or washing water.

It is general that a general dishwasher includes a tub for providing a washing space, a rack provided inside the tub, in which a washing target is received, a spray arm for spraying the washing water to the rack, a sump for storing the washing water therein, and a pump for supplying the washing water stored in the sump to the spray arm.

Generally, the dishwasher includes a support for controlling a height of the dishwasher. However, a problem occurs in that the dishwasher is damaged as the support is loosed during transportation of the dishwasher before the support is installed.

DISCLOSURE OF INVENTION

Technical Problem

The present invention is directed to a dishwasher that substantially obviates one or more problems due to limitations and disadvantages of the related art. An object of the present invention is to provide a dishwasher that may prevent a support, which supports the dishwasher, from being loosed within a certain range.

Another object of the present invention is to provide a dishwasher that allows a support to be easily loosed if the support strays out of a certain range.

Solution to Problem

To achieve these objects and other advantages and in accordance with the purpose of the invention, a dishwasher according to the present invention comprises a cabinet; a base forming a lower portion of the cabinet; and a support coupled to a coupling portion provided in the base, supporting the cabinet, wherein the coupling portion includes a hollow shaped coupling hole; and a plurality of first threads formed in the coupling hole, and the support includes a plurality of second threads engaged with the first threads; and a stopper formed to be protruded at a groove of the second thread.

The stopper may be formed at any one of grooves of the plurality of second threads.

The stopper may be provided at a lower one of grooves of the plurality of second threads.

The stopper may be formed at the groove arranged next to bottom.

The stopper connects two of the second threads, which are adjacent to the groove, with each other.

The stopper may be formed to have a relatively high center and relative low both sides. The stopper may be formed to have a center lower than a height of the second thread.

The coupling portion may include an area where the first threads are not formed so as not to be engaged with the second threads.

The support may include a mounting bar, and the coupling portion may include an extension bar that prevents the support from being inserted into the coupling hole any more than a predetermined depth if the support is inserted into the coupling hole at the predetermined depth. The stopper may be arranged in the area if the mounting bar is in contact with the extension bar.

The plurality of first threads may include a third thread formed to be more protruded toward the center of the coupling hole than the first threads, and the third thread may be arranged below the stopper when the mounting bar is in contact with the extension bar.

The third thread may be provided with a stepped piece formed at one end and stepped from the coupling hole, and the stepped piece may be arranged toward the area.

Advantageous Effects of Invention

According to the present invention, a support is prevented from being loosed during transportation of the dishwasher, whereby the dishwasher may be prevented from being damaged.

Also, according to the present invention, the support may easily be loosed when a user changes a position of the dishwasher to a desired height.

BRIEF DESCRIPTION OF DRAWINGS

FIG. 2 is a view illustrating a main portion of one embodiment.

FIG. 3 is a view illustrating a support.

FIG. 4 is a view illustrating a state that a support is coupled to a coupling portion.

FIG. 5 is a view illustrating a state that a support is loosed from a coupling portion at a predetermined length.

BEST MODE FOR CARRYING OUT THE INVENTION

Figure 1:
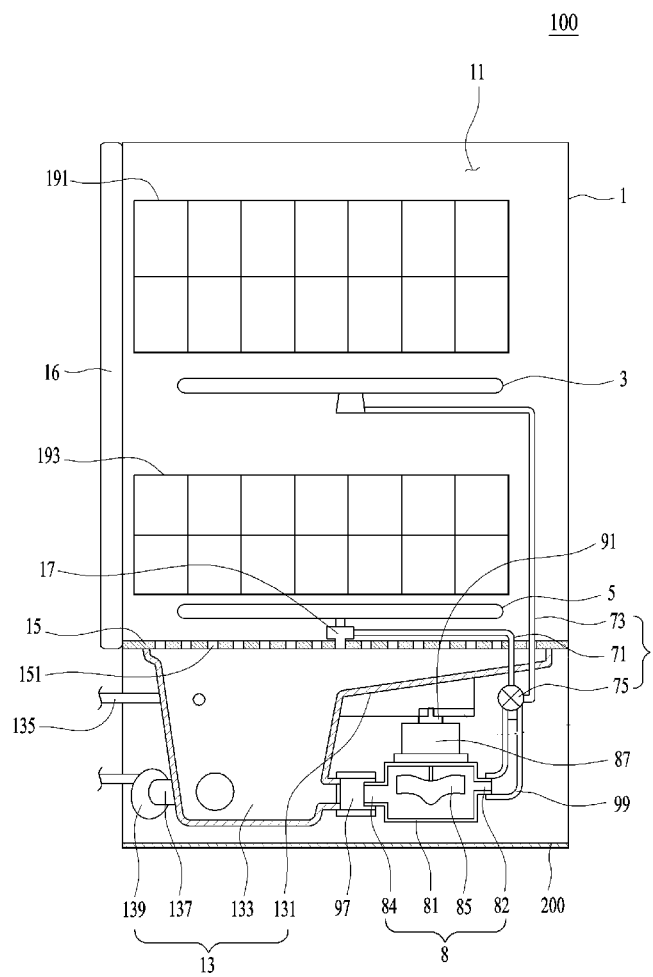
FIG. 1 is a view illustrating a dishwasher according to the present invention.
Figure 1:
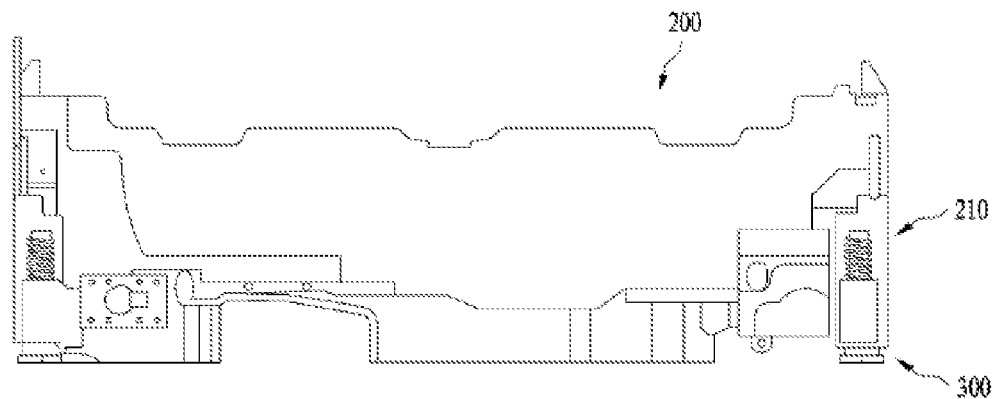

Reference will now be made in detail to the preferred embodiments of the present invention, examples of which are illustrated in the accompanying drawings. Wherever possible, the same reference numbers will be used throughout the drawings to refer to the same or like parts.

For clarification and convenience of description, size and shape of each element shown in the drawings may be enlarged or downsized. Also, the terms defined particularly considering elements and operation of the present invention may be modified depending on intention of a user or person skilled in the art or practices. These terms used herein should be understood not simply by the actual terms used but by the meaning lying within and the description disclosed herein.

As shown in FIG. 1, a dishwasher 100 according to one embodiment of the present invention includes a cabinet 1 constituting appearance, a tub 11 located inside the cabinet 1, providing a washing space, racks 191 and 193 provided inside the tub 11, providing a space in which washing targets are received, spray arms 3 and 5 for spraying the washing water towards the racks, a sump 13 for returning the washing water sprayed into the tub, and a pump 8 for supplying the washing water stored in the sump 13 to the spray arms 3 and 5.

A base 200 is provided below the cabinet 1, and may form lower appearance of the cabinet 1.

The racks 191 and 193 may be categorized into the first rack 191 (upper rack) and the second rack 193 (lower rack) located below the first rack.

The cabinet 1 is provided with a door 16 for opening and closing the tub 11, and the upper rack 191 and the lower rack 193 may be provided to be taken out of the cabinet when the door 16 opens the tub 11.

That is, a rail (not shown) for guiding movement of the racks 191 and 193 to the door 16 may be provided in an inner circumference of the tub 11, and the racks may further be provided with a roller (not shown) supported on the rail.

The sump 13 may be provided to include a storage unit 133 in which the washing water is stored, a cover 15 located above the storage unit 133 to partition the tub 11 from the storage unit 133, and a connecting unit 131 connecting the storage unit 133 to the cover 15.

In this case, the cover 15 may further be provided with a plurality of holes 151 provided to pass through the cover 15, supplying the washing water to the storage unit 133.

The holes 151 may be provided only in an area provided by the cover 15 and located above the storage unit 133, or may be provided in the full area of the cover 15 to supply the washing water inside the tub 11 to the connecting unit 131.

The connecting unit 131 may be provided to be tilted at a predetermined angle towards the storage unit 133 to guide the washing water entering through the holes 151 to the storage unit 133.

Preferably, the tub 11 is located at a space located above the cover 15. This is to allow the washing water sprayed into the tub 11 through the spray arms 3 and 5 to return to the storage unit 133 through the holes 151 and the connecting unit 131 without any separate unit.

The cover 15 may be provided in any kind of shape that may identify an inner space of the cabinet 1, and the connecting unit 131 may be provided to be fixed to the lower portion of the cover 15.

The connecting unit 131 may be provided to fully surround the lower space of the cover 15 (a plane area of the cover is the same as that of a body), or may be provided to surround only a space in which the holes 151 are formed.

In the meantime, the storage unit 133 may be provided in such a manner that the cover 15 may be bent concavely towards a bottom of the cabinet 1. However, it is preferable that the storage unit 133 has a sectional area smaller than an area of the connecting unit 131 and is downwardly tilted towards the storage unit 133.

If the storage unit 133 is provided to have a sectional area smaller than the area of the connecting unit 131, the pump 8 may be located at a lower area of the connecting unit 131, wherein the storage unit 133 is not provided at the lower area of the connecting unit 131, whereby the volume of the dishwasher 100 may be minimized.

The storage unit 133 is supplied with the washing water through a water supply path 135 connected to a water supply source (not shown), and the washing water stored in the storage unit 133 is discharged out of the cabinet 1 through a drainage path 137 and a drainage pump 139.

The spray arms provided in the present invention may include the lower arm 5 for washing the washing target provided inside the tub 11 and received in the lower rack 193, and the upper arm 3 for washing the washing target received in the upper rack 191.

The lower arm 5 and the upper arm 3 are supplied with the washing water through the pump 8 and a supply path 7, wherein the supply path 7 may be provided with a first supply path 71 connected to the lower arm 5, a second supply path 73 connected to the upper arm 3, and a switching valve 75 selectively opening the respective supply paths 71 and 73.

If the lower arm 5 is provided rotatably inside the tub 11, the lower arm 5 may rotatably be coupled to a holder 17 provided in the cover 15, and the first supply path 71 may be provided to supply the washing water to the holder 17.

In the meantime, if the upper arm 3 is provided rotatably inside the tub 11, the upper arm 3 may rotatably be coupled to the second supply path 73.

The pump 8 may include a housing 81 provided with an impeller 85, an inlet 84 through which the washing water flows into the housing 81, an outlet 82 through which the washing water inside the housing 181 is discharged out, and a motor 87 provided outside the housing 181, for rotating the impeller 85.

The inlet 84 is connected to the storage unit 133 through an inlet connecting pipe 97, and the outlet 82 is connected to the switching valve 75 through an outlet connecting pipe 99.

Therefore, if the impeller 85 is rotated as the motor 87 is supplied with a power, the water supplied from the sump 13 to the housing 81 moves to the switching valve 75 through the outlet 82, and the water supplied to the switching valve 75 is supplied to the upper arm 3 or the lower arm 5 along the supply paths 71 and 73 opened by the switching valve 75.

The pump 8 is fixed into the cabinet 1 through an insulating unit 91, wherein the insulating unit is a means for attenuating vibration generated in the pump 8 to prevent the vibration from being transferred to the sump 13 and the cabinet 1.

According to the present invention, it is preferable that two or more insulating units are provided as means for spacing the outer circumference of the pump 8 apart from the bottom of the cabinet 1 at a predetermined distance and spacing the outer circumference of the pump 8 apart from the sump 13 at a predetermined distance.

FIG. 2 is a view illustrating a main portion of one embodiment.

Referring to FIG. 2, the base 200 may be provided with a coupling portion 210 that may support the cabinet 1. The coupling portion 210 may be provided at a plurality of points of the base 200 to support load of the cabinet 1. For example, the coupling portion 210 may be provided at three points of the base 200, whereby the base 200 may be supported by the three points from the bottom.

A support 300 that supports the cabinet 1 is inserted into the coupling portion 210. A length of the support 300 inserted into the coupling portion 210 may be changed, and therefore its height may be changed.

FIG. 3 is a view illustrating a support, and FIG. 4 is a view illustrating a state that a support is coupled to a coupling portion.

Referring to FIGS. 3 and 4, the coupling portion 210 includes a hollow shaped coupling hole 220 and a plurality of first threads 224 formed in the coupling hole 220.

The support 300 includes a plurality of second threads 310 engaged with the first thread 224s, and a stopper 320 formed to be protruded at a groove 314 between the second threads 310.

The plurality of second threads 310 may be formed consecutively to each other and provided along an outer circumference of the support 300.

That is, the second threads 310 may be engaged with the first threads 224, whereby a depth of the support 300 inserted into the coupling hole 220 may be controlled, and a height of the dishwasher may be controlled.

The grooves 314 are formed between the respective second threads 310 to have a height lower than the second thread 310. The stopper 320 is provided at the groove 314, whereby the groove 314 becomes higher at the portion where the stopper 320 is arranged.

The stopper 320 may be formed at any one of the grooves 314 of the plurality of second threads 310. That is, one stopper 320 not a plurality of stoppers may be provided to connect two threads 310 with each other. Since only one stopper 320 is provided, only a little friction may be generated between the stopper 320 and the first thread 224 even though the stopper 320 is in contact with the first thread 224. For example, if a plurality of stoppers are provided, since an area of the stopper 300 which is in contact with the coupling portion 210 is large, friction becomes large to act as an obstacle in movement of the support 300. By contrast, in this embodiment, it is advantageous that a little friction is generated between the stopper 320 and the coupling portion 210 when the support 300 controls its length coupled to the coupling portion 210.

The stopper 320 may be formed longitudinally in a direction parallel with a moving direction of the support 300 when the support 300 is rotated. The support 300 has a screw shape, and if the support 300 is rotated, the support 300 may move upwardly or downwardly based on FIG. 3. That is, the stopper 320 may be extended longitudinally in a vertical direction based on FIG. 3.

The stopper 320 may be formed to have a relatively high center and relatively low both sides.

Of course, the stopper 320 may be formed to have a center lower than the height of the second thread 310. Since the amount of interference of the stopper 320 with the first thread 244 may be reduced as compared with the case that the stopper 320 has a shape extended as much as the height of the second thread 310, the support 300 may easily be moved within the coupling portion 210.

Meanwhile, the stopper 320 may be provided at the lower one of the grooves 314 of the plurality of second threads 310. If the stopper 320 is provided at the lower groove 314, the stopper 320 may be in less contact with the coupling portion 210 than the stopper 320 provided at the upper one of the grooves 314 of the second threads 310, whereby the support 320 may be moved with a little friction.

Particularly, the stopper 320 may be formed at the groove 314 arranged next to bottom.

The coupling portion 210 may include an area 232 where the first threads 224 are not formed so as not to be engaged with the second threads 310. That is, the plurality of first threads 224 may be spaced apart from each other based on the area 232 without being consecutively formed in one body. That is, if a virtual extension line connecting the plurality of first threads 224 is drawn, one overall thread is formed but the first threads 224 are arranged to be disconnected from each other on the virtual extension line.

The plurality of first threads 224 may include a third thread 226 formed to be more protruded toward the center of the coupling hole 220 than the other first thread. That is, the third thread 226 is higher than the first thread 224.

At this time, since the height of the third thread 225 is not high to be in contact with the groove 314, interference does not occur between the third thread 226 and the groove 314.

Particularly, a stepped piece 228 is formed to be stepped from the coupling hole 220 at one end of the third thread 226, and may be arranged toward the area 232.

When the stopper 320 passes through the area 232, since the stopper 320 is not in contact with the coupling portion 210, a user may rotate the support 300 at a small force without feeling friction caused by the stopper 320 when moving the support 300 by rotating the support 300.

Particularly, if the first thread 224 has a height so as not to be in contact with the stopper 320, the user does not feel inconvenience caused by the stopper 320 in rotating the support 300.

However, since friction caused by interference between the third thread 226 and the stopper 320 occurs when the support 300 is in contact with the third thread 226, the user should rotate the support 300 by applying a force for overcoming the friction when moving the support 300.

The support 300 includes a mounting bar 330, and the mounting bar 330 is provided with a plane thereon.

The coupling portion 210 may include an extension bar 230 that may prevent the support 300 from being inserted into the coupling hole 220 any more than a predetermined length if the support 300 is inserted into the coupling hole 220 at the predetermined length. That is, if the support 300 is sufficiently inserted into the coupling hole 220, the mounting bar 330 is in contact with the extension bar 230 as shown in FIG. 4a, and the support 300 is not inserted into the coupling hole 220 any more.

If the mounting bar 330 is in contact with the extension bar 230, the stopper 320 may be arranged in the area 230.

Also, since the stopper 320 is arranged in a portion where the second groove is formed, in the state of FIG. 4a, the stopper 320 is arranged at the upper groove of the portion where the third thread 226 is arranged. The third thread 226 is arranged below the stopper 320 when the mounting bar 330 is in contact with the extension bar 230.

Therefore, even though the dishwasher shakes in the state of FIG. 4a or the support 300 is rotated by unwanted movement, the stopper 320 is in contact with the third thread 226, especially the stepped piece 228. The support 300 is not rotated as far as a force that rotates the stopper 320 clockwise in the state of FIG. 4b to pass through the stepped piece 228 is not applied to the support 300. The support 300 may be prevented from being detached from the coupling portion 210.

FIG. 5 is a view illustrating a state that a support is loosed from a coupling portion at a predetermined length.

Referring to FIG. 5, the stopper 320 is arranged below e third thread 226 unlike FIG. 4a.

The stopper 320 is arranged above the third thread 226 in FIG. 4a, whereas the stopper 320 is arranged below the third thread 226 in FIG. 5. In this case, since the stopper 320 should pass through the third thread 226, friction of the third thread 226, which includes the stepped piece 228, should be overcome.

Therefore, since it is difficult for the stopper 320 to pass through the third thread 226 without depending on intentional action of a user or worker, the support 300 may be prevented from being unintentionally detached from the coupling portion 210.

Also, since the stopper 320 is rotated without being in contact with the first thread 224 in the state of FIG. 5 that the stopper 320 is arranged below the third thread 226, friction caused by the stopper 320 does not occur when the user moves the support 300. That is, since the user may control the length of the support 300 inserted into the coupling hole 220 by using a force that may overcome a frictional level between the first thread 224 and the second thread 310, the user may easily control the height of the dishwasher.

That is, in the embodiment of the present invention, the support 300 may be prevented from being detached from the coupling portion 210 by an unwanted operation or status in a state that the support 300 is inserted into the coupling portion 210 at a certain depth or more.

On the other hand, the support 300 may easily be rotated from the coupling portion 210 in a state that the support 300 is taken out of the coupling portion 210 at a specific depth or more, whereby the height of the dishwasher may be controlled due to movement of the support 300.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A dishwasher comprising:
    a cabinet;
    a base forming a lower portion of the cabinet; and
    a support coupled to a coupling portion provided in the base, supporting the cabinet,
    wherein the coupling portion includes:
        a hollow shaped coupling hole;
        a plurality of first threads formed in the coupling hole; and
        an extension bar that prevents the support from being inserted into the coupling hole any more than a predetermined depth,
    wherein the support includes:
        a plurality of second threads engaged with the first threads;
        a stopper formed to be protruded at a groove between the second threads; and
        a mounting bar, and
    wherein the plurality of first threads include a third thread formed to be more protruded toward the center of the coupling hole than the remainder of the plurality of first threads, and the third thread is arranged below the stopper in an axial direction of the support when the mounting bar is in contact with the extension.

2. The dishwasher according to claim 1, wherein the stopper is formed in the groove between any of the second threads.

3. The dishwasher according to claim 2, wherein the stopper is provided in the groove between second threads proximate the mounting bar.

4. The dishwasher according to claim 3, wherein the stopper is formed in the groove nearest the mounting bar.

5. The dishwasher according to claim 1, wherein the stopper connects two of the second threads, which are adjacent to the groove, with each other.

6. The dishwasher according to claim 1, wherein a center of the stopper is higher than sides of the stopper in a circumferential direction of the support.

7. The dishwasher according to claim 1, wherein the stopper is lower than the plurality of second threads in a circumferential direction of the support.

8. The dishwasher according to claim 1, wherein the stopper is formed longitudinally in a direction parallel with a moving direction of the support when the support is rotated.

9. The dishwasher according to claim 1, wherein the coupling portion includes an area where the first threads are not formed so as not to be engaged with the second threads.

10. The dishwasher according to claim 9, wherein the stopper is arranged in the area when the mounting bar is in contact with the extension bar.

11. The dishwasher according to claim 1, wherein the third thread is provided with a stepped piece formed at one end and stepped from the coupling hole.

12. The dishwasher according to claim 11, wherein the coupling portion includes an area where the first threads are not formed so as not to be engaged with the second threads, and the stepped piece is arranged adjacent to the area.

13. The dishwasher according to claim 1, further comprising:
    a plurality of coupling portions, each provided at a corresponding one of a plurality of points of the base.

14. The dishwasher according to claim 1, further comprising:
    a tub arranged inside the cabinet, providing a washing space;
    a rack provided inside the tub, providing a space in which washing targets are received;
    spray arms spraying washing water to the rack;
    a sump returning the washing water sprayed into the tub; and
    a pump supplying the washing water stored in the sump to the spray arms.

* * * * *